2,705,463

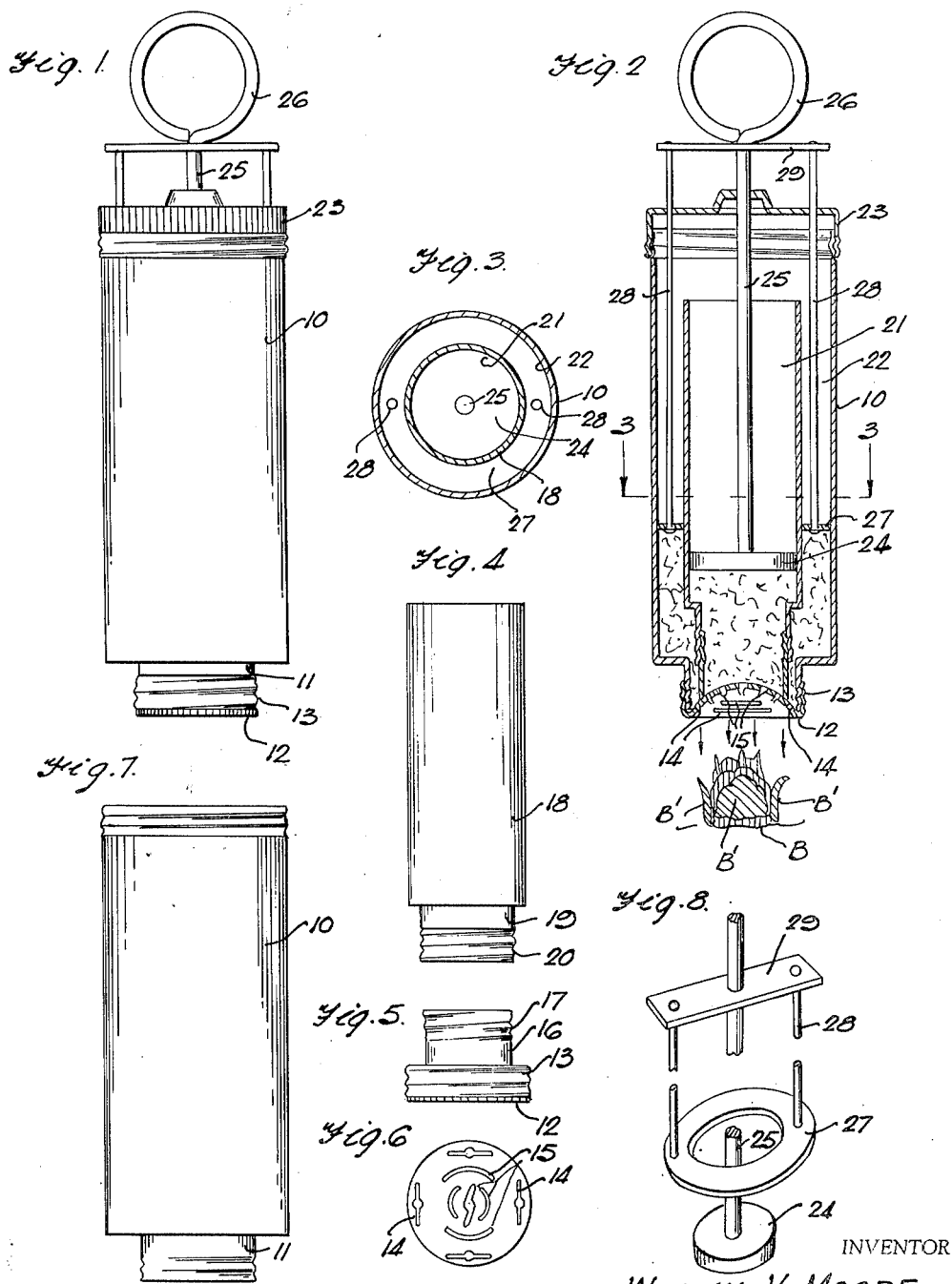

PASTRY DECORATOR

William V. Moore, Marietta, Ga.

Application April 21, 1954, Serial No. 424,574

1 Claim. (Cl. 107—1)

This invention relates to a pastry decorator, and has for one of its objects the production of a simple and efficient pastry ejecting means which is adapted to eject pastry of two or more different colors for the purpose of forming a flower, such as a rose, or other decorative element.

A further object of this invention is the production of a pastry ejecting means, the parts of which may be readily assembled or separated to facilitate cleaning.

Other objects and advantages of the present invention will appear throughout the following specification and claim.

In the drawing:

Figure 1 is a side elevational view of the decorator;

Figure 2 is a vertical sectional view thereof;

Figure 3 is a transverse sectional view taken on line 3—3 of Figure 2;

Figure 4 is a side elevational view of the inner container;

Figure 5 is a side elevational view of the design forming nozzle or cap;

Figure 6 is a bottom plan view of the nozzle or cap;

Figure 7 is a side elevational view of the outer container or casing;

Figure 8 is a fragmentary perspective view of the ejector plunger elements.

By referring to the drawing in detail, it will be seen that 10 designates the outer container or casing which is provided with a reduced threaded neck portion 11 having an open outer end. A design forming nozzle or cap 12 is removably fitted upon the neck portion 11 through the medium of the inturned threaded flange 13. The cap 12 is provided with outer design forming slots 14, and a suitable number of design forming slots 15 formed inwardly toward the center of the cap 12. The cap 12 is also provided with an inset neck 16 having a threaded portion 17. The neck 16 separates the slots 14 from the slots 15, as is shown in Figure 2.

A tubular inner container 18 is fitted within the outer container or casing 10 and is provided with a reduced neck portion 19 having threads 20 formed thereon. The inset neck 16 of the nozzle or cap 12 is adapted to be threaded into the threaded portion 20 of the neck 19 or to otherwise fit into engagement therewith. The neck 16 supports the inner container 18 within the outer container or casing 10, as is shown in Figure 2. This connection separates the chamber 21 of the inner container 18 from the chamber 22 of the outer container.

An inwardly curved closure cap 23 is threaded upon, or otherwise secured to, the upper open end of the outer container 10. A plunger head 24 is slidably mounted within the chamber 21 and is carried by the central plunger rod 25. A finger ring 26 is carried by the upper end of the rod 25 to facilitate the operation thereof. A plunger ring 27 is slidably mounted within the chamber 22 and is carried by a plurality of plunger rods 28 arranged in diametric relation upon opposite sides of the inner container 18, as shown in Figures 2 and 3. A yoke plate 29 supports the upper ends of the rods 28, the rods 28 being suspended from the yoke plate 29, as shown. The central plunger rod 25 is slidably mounted through the plate 29 so that the rod 25 may freely reciprocate therethrough. The rod 25 and the rods 28 are slidably mounted through the closure cap 23.

The chamber 21 preferably contains a desired decorating material of one selected color, such as red, and the chamber 22 preferably contains material of another selected color, such as green. As the plunger head 24 and the plunger ring 27 are moved downwardly by pressure upon the ring 26 and yoke plate 29, by the operator, material will be ejected through the design forming cap 12. The material of one color, such as red, will be ejected from the inner chamber 21 by means of the plunger head and this material will pass out through the design forming slots 15. The material of another color, such as green, will be ejected from the chamber 22 which encircles the inner chamber 21 by means of the plunger ring 27, through the outer design forming slots 14, the connection of the neck 16 with the neck 19 preventing the differently colored material from commingling. As the material is ejected through the cap 12, a design of a rose or rose bud B will be simulated having green leaves B'. The green leaves B' are formed by means of the ejection of material through the slots 14, and the red rose B is formed by means of the ejection of material through the slots 15. The abutment of the ring 26 with the yoke plate 29 will facilitate simultaneous operation of the plunger 24 and plunger ring 27 when desired, during the formation of the flower, such as the rose, or other desired design.

The cap 12 may be suitably designed to form various designs simulating flowers, or other selected objects, within the spirit of the invention. It should be noted that the present device provides a means for quickly and efficiently forming a pastry decoration of several colors, and that the parts of the device may be quickly separated for cleaning or replacement of parts, and may also be quickly and readily assembled. Any design, object, flower, or the like, may be produced merely by substituting suitably designed slots in the cap 12, within the spirit of the invention. This structure may be used for producing decoration for bakery products, such as cakes and the like, or it may be used for producing small pastries, such as cookies, and the like.

Certain detail changes in the structure may be employed without departing from the spirit of the invention, so long as such changes fall within the scope of the appended claim.

Having described the invention, what I claim as new is:

A device of the class described comprising an outer container, an inner container fitting within the outer container and defining an inner and an outer chamber, ejecting means for said chambers, a design forming cap detachably secured to said outer container, said cap having an inset neck detachably secured to said inner container, said cap having one group of slots communicating with said outer chamber, said cap having a second group of slots communicating with said inner container, the inset neck of said cap separating the groups of slots in a manner whereby material from one chamber is ejected through one group of slots and material from the other chamber is ejected through the other group of slots, said ejecting means comprising a plunger head in said inner chamber, a plunger ring in said outer chamber, a plunger rod connected to said plunger head, a grip member carried by said plunger rod, plunger rods connected to said plunger ring, a yoke plate connecting said second mentioned plunger rods, and a closure cap for said outer container and constituting a guide for said plunger rods.

UNITED STATES PATENTS

References Cited in the file of this patent

| 249,227 | Dosh | Nov. 8, 1881 |
|---|---|---|
| 1,602,331 | Britton | Oct. 5, 1926 |
| 2,419,654 | Moore | Apr. 29, 1947 |